March 5, 1968 M. BÖRNER ET AL 3,372,351

MECHANICALLY STRONG MECHANICAL RESONANT FILTER HAVING WEAK COUPLING BETWEEN RESONATORS

Filed Jan. 20, 1964

Inventors:
Manfred Börner
Hans Schüssler
By: Spencer & Kaye
ATTORNEYS

United States Patent Office 3,372,351

Patented Mar. 5, 1968

3,372,351

MECHANICALLY STRONG MECHANICAL RESONANT FILTER HAVING WEAK COUPLING BETWEEN RESONATORS

Manfred Börner, Ulm (Danube), and Hans Schüssler, Beimerstetten, Germany, assignors to Telefunken Patentverwertungs-G.m.b.H., Ulm (Danube), Germany Filed Jan. 20, 1964, Ser. No. 338,724
Claims priority, application Germany, Jan. 18, 1963, T 23,355
15 Claims. (Cl. 333—71)

The present invention relates generally to the filter art, and, more particularly, to mechanical resonant filters of the type constructed of mechanical resonant bodies and homogeneous or uniform coupling lines connected between these resonant bodies.

As is known, in both electrical and in mechanical filters with an oscillatory circuit having a given quality factor, the bandwidth depends upon the value of the coupling factor. There has generally been a desire to provide as high a coupling factor as possible in the construction of mechanical resonant filters, because such filters naturally have a relatively small bandwidth because of the quality factor of their oscillatory circuits which is much higher than that of electrical filters.

However, for several uses in the communications field, there is the requirement for mechanical resonant filters having an extremely small relative bandwidth. According to the previously customary technique in connection with mechanical filters of the type having mechanical resonant bodies and homogeneous coupling lines between the bodies, the coupling factor between adjacent resonators may be minimized to such an extent that a relative bandwidth up to 2% of the resonant frequency can be obtained. Experience has shown that this may be accomplished by reducing the cross section of the coupling lines and thereby increasing their oscillatory resistance. However, in order to obtain still smaller relative bandwidths this previously used technique can not be used for essentially two reasons. First, the mechanical stability of the filter bodies, which depends also very substantially on the coupling lines between the resonators, becomes too small if the coupling lines are made even thinner. Second, these filters of smaller bandwidth produce stronger secondary wave components close to their pass range.

This can be explained as being due to the constant spacing of the resonators from one another which results from the geometry of resonator arrangements wherein quarter-wavelength couplings of a higher order must be used in the case of coupling lines which are very thin. In such an arrangement resonances at odd multiples of the quarter-wavelength resonance are desired. This means that coupling lines which are the length of $$(2n+1)\frac{\lambda}{4}$$

must be used wherein $\lambda$=wavelength at the center frequency of the coupling line and $n$ is an integer 0, 1, 2 . . . . However, the disturbing secondary wave which is most closely adjacent results from oscillations of the coupling lines at a frequency which is determined from the $2n\cdot\lambda/2$ resonance of the coupling lines. The relative frequency spacing $1/2n$ of the secondary wave from the filter pass range diminishes when the ordinal number $n$ is increased and the undesired effect described above occurs because of this relationship.

With these defects of the prior art in mind, it is a main object of the present invention to provide a mechanical filter arrangement having a particularly small relative bandwidth.

A further object of the invention is to provide a device of the character described wherein a small relative bandwidth is obtained without adversely affecting the mechanical stability of the device.

These objects and others ancillary thereto are accomplished in accordance with preferred embodiments of the invention wherein a plurality of resonant bodies are coupled together with the use of coupling lines. In order to reduce the coupling factor at least two coupling lines are provided between at least two resonant bodies directly coupled with each other for coupling oscillations which are only approximately phase-shifted by 180° in the pass wave range. They are so arranged between the resonators that when in homogeneous form they differ from each other by a portion of a line which has an acoustical length of $(2n-1)(\lambda_0/2)$ wherein $\lambda_0$=wavelength at the center frequency of the coupling line and $n$ is equal to 1, 2, 3 . . . . Instead, the coupling lines may be so arranged that one of the two coupling lines is fastened to those places on the surfaces of the resonators to be coupled together which oscillate in the same phase while the other of the two coupling lines with the same acoustical length is fastened to those places on the surfaces of the resonators to be coupled together which oscillate at least approximately in phase opposition.

Mechanical resonant filters have previously been proposed (copending application Ser. No. 291,398, filed June 28, 1963) where an attempt has been made to produce dips in the filter characteristic at non-real frequencies wherein points on the surfaces of resonators which are not directly coupled with one another and which oscillate approximately in phase opposition at certain frequencies are connected by additional coupling lines. However, such additional coupling lines only produce these dips at certain frequencies and they are not capable of reducing the coupling factor over the entire pass range of the resonant filter.

In a particularly advantageous embodiment of the present invention coupling lines of different length are used and the two coupling lines differ from each other by an acoustical length of only $\lambda/2$.

When using coupling lines of equal acoustical length for connecting surface points of two directly coupled resonators oscillating in phase as well as in phase opposition, these resonators may be arranged immediately adjacent one another in the filter chain of resonant bodies.

Additional objects and advantages of the present invention will become apparent upon consideration of the following description when taken in conjunction with the accompanying drawings in which.

Figure 1:
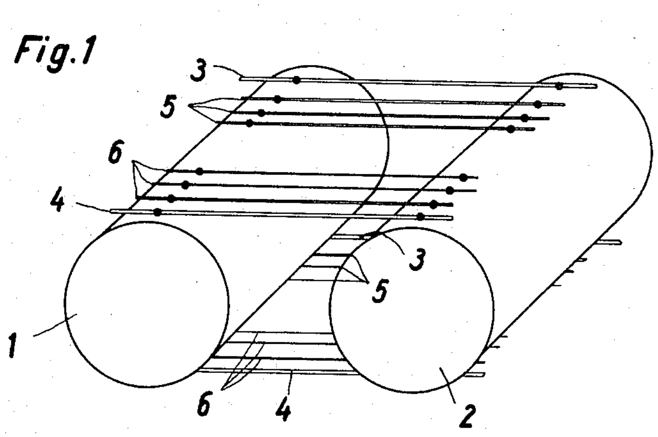
FIGURE 1 is a diagrammatic perspective view showing a portion of a mechanical resonant filter as constructed in accordance with the present invention.

With more particular reference to FIGURE 1, a portion of a mechanical resonant filter is shown constructed of two resonant bodies or resonators 1 and 2 which may be excited to longitudinal oscillations. They are coupled together by means of coupling lines 3, 4, 5, and 6 which can be excited to bending oscillations. The cross-sectional dimensions of the bending coupling lines 3 and 4 are provided with a suitable shape and size so that at the predetermined spacing between those points where they are fastened to the surfaces of the resonators they are of exactly an acoustical length of $\lambda/4$.

The other coupling lines 5 and 6 in contradistinction thereto have a smaller and/or different cross-sectional area so that their acoustical length as compared to that of the coupling lines 3 and 4 is larger by an odd multiple of λ/2, with the geometric length remaining the same. In bending coupling lines the acoustical length of the coupling rod or bar depends upon the geometric length of the rod as well as upon its cross section and it is therefore possible by using coupling rods of the same geometrical length to couple oscillations of differing phase and, in the present case, the phase shift amounts most preferably to 180°.

As shown in FIGURE 1 there is not only a single additional coupling line 5 and 6, respectively, correlated to a direct coupling line 3 and 4, respectively, as would be sufficient in theory for lowering the coupling factor, but rather, there are three additional coupling lines 5 and 6, respectively, which in the same manner couple a wave which oscillates in phase opposition to the wave of the coupling lines 3 and 4 which are λ/4 in length. The purpose of this plurality of additional coupling lines is to increase the coupling factor of the oppositely-phased waves because each of the additional coupling lines due to its smaller cross section in comparison to the coupling lines 3 and 4 has a much smaller oscillatory resistance and thus a much smaller coupling factor.

Therefore, for certain applications the total coupling factor can not be sufficiently reduced when only a single additional coupling line 5 or 6, respectively, is used. In order to assure that the oscillatory resistance of the coupling line 3 or 4 and of the coupling line 5 or 6 will not be too different from one another, it has proven to be advantageous to construct the coupling lines 3 and 4 of an acoustical length of 3λ/4 and the coupling lines 5 and 6 of an acoustical length of 5λ/4.

The mechanical resonant filter as shown in FIGURE 1 provided with coupling lines which may be excited to bending oscillations may also be constructed in a manner which is known per se so that the resonators are excited to bending, torsional, or shear oscillations rather than longitudinal oscillations. The above discussion in connection with bending coupling lines is correspondingly applicable.

Figure 2:
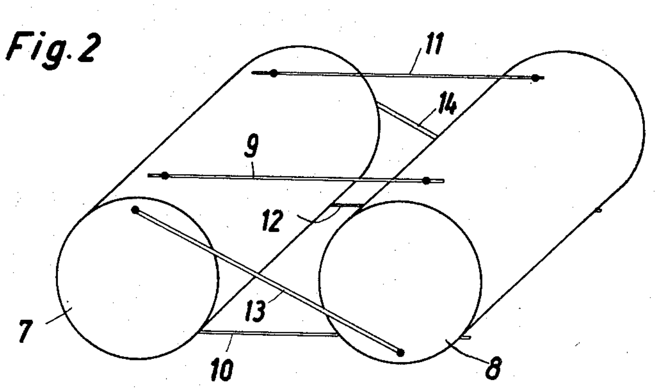
FIGURE 2 is a diagrammatic perspective view of another embodiment of the present invention.

With more particular reference to FIGURE 2, another embodiment of the invention is shown and only a portion of a complete filter is illustrated. Two resonators 7 and 8 which may be excited to torsional oscillations are provided and are coupled with each other by coupling lines 9, 10, 11 and 12 which are λ/4 in length and may be excited to longitudinal oscillations. In order to reduce the coupling factor between the resonators 7 and 8 additional longitudinally oscillating coupling lines 13 and 14 are provided having acoustical lengths which are identical to those of the coupling lines 9 through 12. However, coupling lines 13 and 14 are, respectively, fastened to points on the resonator surfaces which oscillate in phase opposition. This is accomplished by fastening the coupling lines or wires 13 and 14 to points on the end surfaces of resonators 7 and 8 which oscillate in phase opposition.

Figure 3:
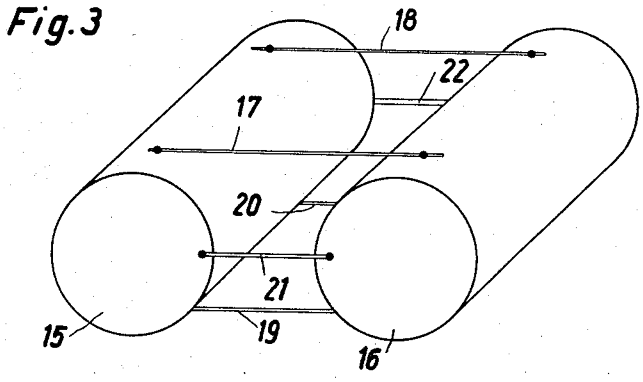
FIGURE 3 is a schematic perspective view of still a further embodiment of the invention.

With more particular reference to FIGURE 3, a further embodiment of the invention is shown and wherein only a portion of a complete filter is illustrated. This filter includes resonators 15 and 16 which may be excited to torsional oscillations and which are coupled to one another by means of coupling lines 17, 18, 19, and 20. These lines may be excited to longitudinal oscillations and have acoustical lengths of λ/4.

Two additional and phase-shifting coupling lines 21 and 22 are provided in the form of rods which may be excited to bending oscillations. The cross section of these rods at a given length is such that the acoustical length of the coupling lines 21 and 22 differs from those of coupling lines 17 through 20 by an odd multiple of λ/2. Preferably, the acoustical length of the coupling lines 21 and 22 is 3λ/4 in this embodiment.

It should be noted that it is also possible to construct this third embodiment of the present invention to excite the coupling lines which are connected in phase opposition between the resonators to different modes of oscillation in a different manner, for example, by using torsionally-coupled torsional oscillators which are additionally coupled with one another by means of a line portion which may be excited to bending oscillations.

A performed filter according to the present invention for example possessed eight longitudinal resonators which were coupled by four bending rods. The resonators, having a frequency of 455 kc./s., a length of 5.5 mm., a diameter of 1.4 mm., and a distance from each other of 1.6 mm., were of a nickel-iron alloy with a small temperature coefficient of the frequency.

The couplings were made by one gilded nickel-iron wire of a thickness of 0.15 mm., which was fixed in a distance of 1.38 mm. from the node of the resonators, and three gilded nickel-iron wires of a thickness of 0.075 mm., which are fixed at the ends of the free sides of the resonators. The wires were fixed by point-welding.

The resulting coupling coefficient of the adjacent resonators K is the difference of the coupling $K_1$, made by the three wires with a thickness of 0.075 mm. and the coupling $K_2$, made by the wire of a thickness of 0.150 mm.: $K_1=0.45\%$, $K_2=0.42\%$, $K=0.03\%$. The bandwidth of such a mechanical filter was nearly 300 c./s. The filter was driven by two piezoelectric transducers in form of longitudinal vibrating tubes made of PZT-ceramic connected to the first and last resonator by thin coupling rods.

It will be understood that the above description of the present invention is susceptible to various modifications, changes and adaptations, and the same are intended to be comprehended within the meaning and range of equivalents of the appended claims.

What is claimed is:

1. A mechanical resonant filter device having a small relative bandwidth comprising, in combination:
- at least two mechanical resonant bodies; and
- homogeneous coupling line means for directly connecting said resonant bodies, said coupling means including at least two coupling lines connected for coupling oscillations which are only approximately 180° phase-shifted with respect to each other in the pass wave range for reducing the coupling factor, said coupling lines having an acoustical length of $(2n+1)\lambda/4$, where λ=wavelength at the center frequency of the coupling line and $n$ is equal to an integer.

2. A device as defined in claim 1 wherein said two coupling lines differ by a line portion of $(2n-1)(\lambda_0/2)$ acoustical length where $\lambda_0$=wavelength at the center frequency of the coupling line and $n$ is equal to 1, 2, 3 . . . .

3. A device as defined in claim 1 wherein the coupling lines differ from each other by an acoustical length of λ/2.

4. A device as defined in claim 1 wherein the two resonators which are directly connected by the coupling lines for reducing the coupling factor are arranged immediately adjacent each other.

5. A device as defined in claim 1 wherein both coupling lines connected in phase opposition for reducing the coupling factor are arranged to be excited to different modes of oscillation.

6. A mechanical resonant filter device, comprising, in combination:
- a plurality of mechanical resonant bodies arranged for connection in a filter chain arrangement;
- a first group of coupling lines all of the same acoustical length, for directly coupling adjacent bodies, the acoustical length of said first group of coupling lines being equal to $(2n+1)\lambda/4$, where λ=wavelength at the center frequency of the coupling line and $n$ is equal to an integer; and
- a second group of coupling lines for directly coupling adjacent bodies all of the lines of said second group being of the same acoustical length which is smaller than the acoustical length of said first group of coupling lines but of the same geometrical length, the difference in the acoustical lengths of the two groups providing approximately a 180-degree phase shift in the pass wave range for reducing the coupling factor.

7. A device as defined in claim 6 wherein there are more lines in said second group than in said first group.

8. A device as defined in claim 7 wherein the lines of the two groups differ in acoustical length by an odd multiple of $\lambda/2$.

9. A mechanical resonant filter device, comprising, in combination:

a plurality of mechanical resonant bodies arranged for connection in a filter chain arrangement;

a first group of coupling lines all of the same acoustical length for directly coupling adjacent bodies and each being connected between surfaces on said bodies which oscillate in the same phase; and a second group of coupling lines for directly coupling adjacent bodies, said second group of coupling lines being of the same acoustical length as said first group of coupling lines, each of the lines of said second group being connected between surfaces on said bodies which oscillate approximately in phase opposition for reducing the coupling factor.

10. A device as defined in claim 9 wherein said bodies are arranged to be excited to torsional oscillations, the lines of the first group are connected between corresponding points of the side surfaces of the bodies, and the lines of the second group are connected between complementary points on the end surfaces of the bodies which oscillate approximately in phase opposition for reducing the coupling factor.

11. A mechanical resonant filter device, comprising, in combination:

a plurality of mechanical resonant bodies arranged for connection in a filter chain arrangement;

a first group of coupling lines all of the same acoustical length for directly coupling adjacent bodies; and a second group of coupling lines for directly coupling adjacent bodies, all of the lines of said second group being of the same acoustical length which is greater than the acoustical length of said first group of coupling lines but of shorter geometrical length for providing a 180 degree phase shift in the pass range for reducing the coupling factor.

12. A device as defined in claim 11 wherein said bodies are arranged to be excited to torsional oscillations, the lines of the first group are connected between corresponding points of the side surfaces of the bodies, and the lines of the second group are connected between complementary points on the end surfaces of the bodies.

13. A mechanical resonant filter device comprising, in combination:

at least two mechanical resonant bodies; and homogeneous coupling line means for directly connecting said resonant bodies, said coupling means including at least two coupling lines of the same acoustical length, one of said coupling lines being connected to points on the surfaces of the resonators to be coupled together which oscillate in the same phase, and the other of the two coupling lines being connected to points on the surfaces of the resonators to be coupled together which oscillate at least approximately in phase opposition to one another for reducing the coupling factor.

14. A mechanical resonant filter device comprising, in combination:

at least two mechanical resonant bodies arranged to be excited to torsional oscillations; and homogeneous coupling line means for directly connecting said resonant bodies, said coupling means including at least two coupling lines arranged to be excited to longitudinal oscillations, both coupling lines having the same acoustical length, one of the two coupling lines coupling points on the surface of the resonators oscillating in phase and the other of the two coupling lines coupling points on the surface of the resonators oscillating in phase opposition for reducing the coupling factor.

15. A mechanical resonant filter device comprising, in combination: at least two mechanical resonant bodies; and homogeneous coupling line means for directly connecting said resonant bodies, said coupling means including at least two coupling lines connected for coupling oscillations which are only approximately 180 degrees phase shifted in the pass wave range for reducing the coupling factor, said coupling lines having an acoustical length of $(2n+1)\lambda/4$, where $\lambda$=wavelength at the center frequency of the coupling line and $n$ is equal to an integer, said coupling lines being arranged to be excited to bending oscillations, and having a shape and size in their cross-sectional dimensions so that with the same geometric length of the coupling lines a phase shift of approximately 180 degrees is provided between the coupling oscillations.

References Cited

UNITED STATES PATENTS

| | | | |
|---|---|---|---|
| 2,856,588 | 10/1958 | Burns | 333—71 |
| 2,955,267 | 10/1960 | Mason | 333—71 |
| 2,969,511 | 1/1961 | Borner | 333—71 |
| 3,013,228 | 12/1961 | Kettel | 333—71 |

OTHER REFERENCES

I.E.E.E. Spectrum, September 1966, "New Mechanical Filters," p. 151.

ELI LIEBERMAN, *Primary Examiner.*

HERMAN KARL SAALBACH, *Examiner.*

R. D. COHN, C. BARAFF, *Assistant Examiners.*